US012567777B2

(12) United States Patent
Sasaki et al.

(10) Patent No.: US 12,567,777 B2
(45) Date of Patent: Mar. 3, 2026

(54) COIL AND ROTARY MACHINE

(71) Applicants: TOP CO., LTD., Fukui (JP); FUKUI PREFECTURAL GOVERNMENT, Fukui (JP)

(72) Inventors: Kenji Sasaki, Fukui (JP); Hitoshi Otaki, Fukui (JP); Yoshinori Sasaki, Fukui (JP); Taiki Tanaka, Fukui (JP); Tomoya Okahashi, Fukui (JP)

(73) Assignees: TOP CO., LTD. (JP); FUKUI PREFECTURAL GOVERNMENT (JP)

( * ) Notice: Subject to any disclaimer, the term of this patent is extended or adjusted under 35 U.S.C. 154(b) by 188 days.

(21) Appl. No.: 18/290,060

(22) PCT Filed: Mar. 30, 2022

(86) PCT No.: PCT/JP2022/016022
§ 371 (c)(1),
(2) Date: Nov. 9, 2023

(87) PCT Pub. No.: WO2022/239561
PCT Pub. Date: Nov. 17, 2022

(65) Prior Publication Data
US 2024/0243633 A1      Jul. 18, 2024

(30) Foreign Application Priority Data
May 12, 2021      (JP) ................................. 2021-081283

(51) Int. Cl.
*H02K 3/28*      (2006.01)
*H02K 1/16*      (2006.01)
(Continued)

(52) U.S. Cl.
CPC ................. *H02K 3/28* (2013.01); *H02K 1/16* (2013.01); *H02K 3/18* (2013.01); *H02K 3/522* (2013.01); *H02K 1/14* (2013.01)

(58) Field of Classification Search
CPC ......... H02K 3/18–20; H02K 3/52–522; H02K 15/022; H02K 15/095; H02K 15/22
(Continued)

(56) References Cited

U.S. PATENT DOCUMENTS 10,348,150 B2 *   7/2019   Miyamoto ............. H02K 3/522

FOREIGN PATENT DOCUMENTS

JP      2005304244 A      10/2005
JP      2011036092 A   *   2/2011
(Continued)

OTHER PUBLICATIONS

JP-2011036092-A machine translation (Year: 2011).*
(Continued)

*Primary Examiner* — Oluseye Iwarere
*Assistant Examiner* — Minki Chang
(74) *Attorney, Agent, or Firm* — Lerner David LLP

(57)                ABSTRACT

A coil includes a first coil layer and a second coil layer which is formed by winding a rectangular conductor. A side surface of the second coil layer contacts a side surface of the first coil layer in a second direction that is perpendicular to a radial first direction where the rectangular conductor over-laps. In the first coil layer, a second portion contacts a first portion. In the second coil layer, a fourth portion contacts a third portion. An outer surface of the third portion is closer to an outer peripheral side in the first direction than the outer surface of the first portion, and is closer to an inner periph-eral side in the first direction than an outer surface of the second portion. An outer surface of the fourth portion is
(Continued)

closer to the outer peripheral side in the first direction than the outer surface of the second portion.

6 Claims, 8 Drawing Sheets

(51) Int. Cl.
  *H02K 3/18*          (2006.01)
  *H02K 3/52*          (2006.01)
  *H02K 1/14*          (2006.01)
(58) Field of Classification Search
  USPC ................................. 310/179, 195, 206, 208
  See application file for complete search history.

(56)                  References Cited

FOREIGN PATENT DOCUMENTS

| | | |
|---|---|---|
| JP | 2014093846 A | 5/2014 |
| JP | 2014093847 A | 5/2014 |
| JP | 2016063663 A | 4/2016 |
| WO | 2014068695 A1 | 5/2014 |
| WO | 2020128147 A1 | 6/2020 |

OTHER PUBLICATIONS

International Search Report for Application No. PCT/JP2022/016022 mailed Jun. 7, 2022. 3 pages.
Extended European Search Report including Written Opinion for Application No. 22807265.8 dated Apr. 4, 2025, pp. 1-10.

* cited by examiner

CIRCUMFERENTIAL DIRECTION

LAMINATION DIRECTION

CIRCUMFERENTIAL
DIRECTION

Figure 3:
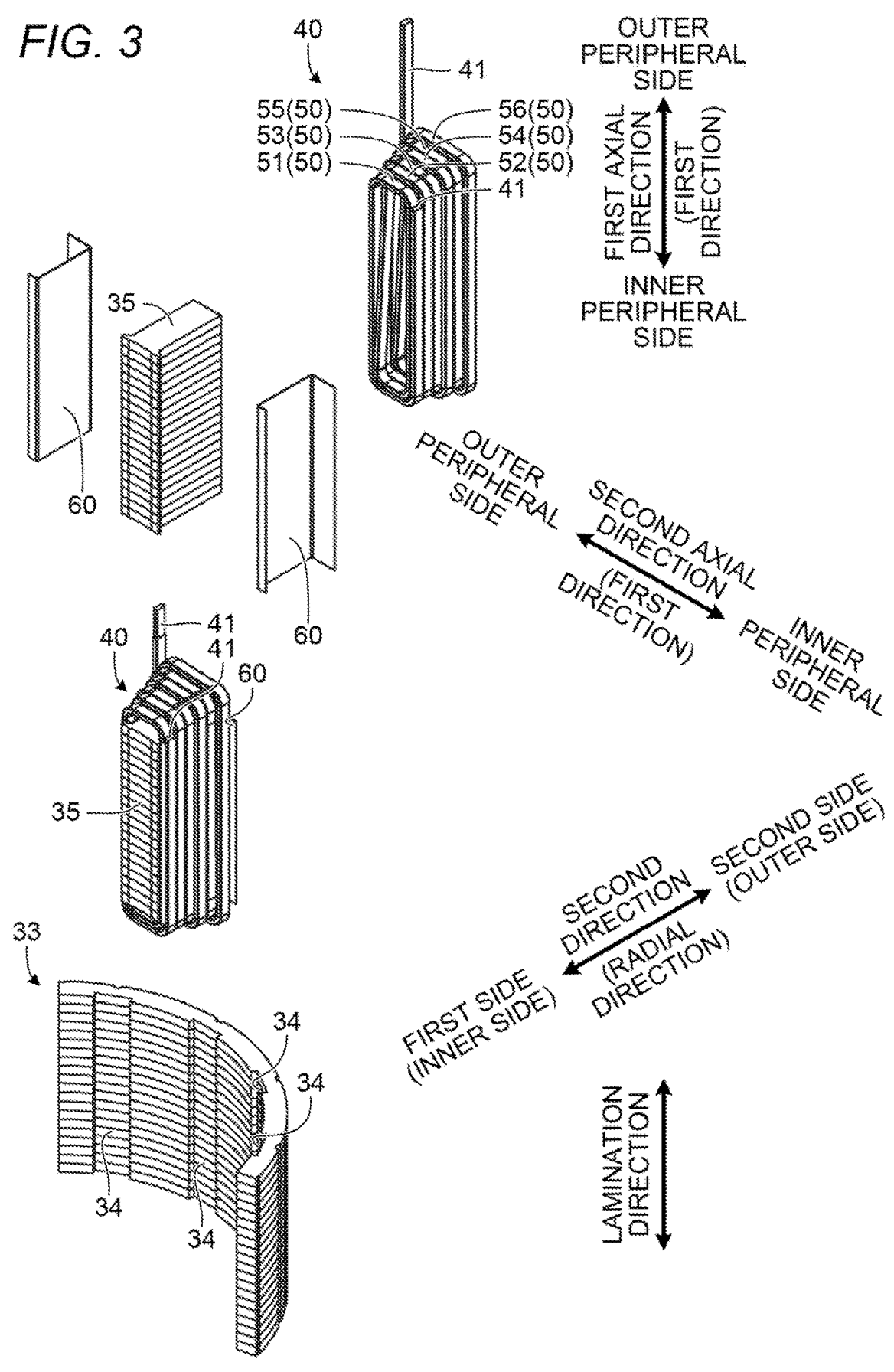

OUTER
PERIPHERAL
SIDE

FIRST AXIAL DIRECTION
(FIRST DIRECTION)

INNER
PERIPHERAL
SIDE

OUTER
PERIPHERAL
SIDE

SECOND AXIAL DIRECTION
(FIRST DIRECTION)

INNER
PERIPHERAL
SIDE

SECOND
DIRECTION
(RADIAL DIRECTION)

SECOND SIDE
(OUTER SIDE)

FIRST SIDE
(INNER SIDE)

LAMINATION DIRECTION

COIL AND ROTARY MACHINE

CROSS REFERENCE TO RELATED APPLICATIONS

This application is a national phase entry under 35 U.S.C. § 371 of International Application No. PCT/JP2022/016022, filed Mar. 30, 2022, which claims priority to Japanese Patent Application No. 2021-081283, filed May 12, 2021, the entire disclosures of which are hereby incorporated by reference herein.

TECHNICAL FIELD

The present invention relates to a coil and a rotary machine such as a motor and a generator.

BACKGROUND ART

Patent document 1 discloses a winding structure. The winding structure uses a wire material whose cross-section shape having a rectangular shape. The cross-section shape of the rectangular wire material is rectangular. The winding structure is arranged to have a plurality of winding layer portions in close contact with each other in a thickness direction. The thickness direction of the winding layer portion is a long side direction of the cross-section of the wire material having the rectangular cross-section. The inner portion of the winding structure is formed with a space. In this space, a support body is inserted, and the winding structure is attached to this support body. The winding layer portion is overlapped in a spiral shape by deforming the wire material with the rectangular cross-section so as to curve at right angles in a short side direction of the cross-section. "Spiral shape" is a state in which one wire material is laminated so as to overlap while going around. "Helical shape" is a state in which one wire material is not laminated while going around and, is shifted in the thickness direction of the winding layer portion. The winding layer portion may be curved in the long side direction of the cross-section of the wire material and be overlapped in a spiral shape.

The winding layer portion is formed by a plurality of circumferential portions. The circumferential portion, by deforming the wire material in a curved manner at four points in a right-angle direction, has a rectangular shape with rounded corners when viewed from the thickness direction of the winding layer portion. Corners of the circumferential portion are formed into a curved portion with a predetermined curvature. Side portions of the circumferential portion are formed into a straight shape and include a pair of longitudinal side portions and a pair of transvers side portions. In curved portions that become corner portions, the curvature gradually decreases from the circumferential portion on an inner peripheral side to the circumferential portion on an outer peripheral side. Along with this, the plurality of circumferential portions is overlapped so that the wire material is in close contact with each other over the entire circumference.

The winding structure includes a first winding layer portion and a second winding layer portion as winding layer portions. The first winding layer portion and the second winding layer portion are arranged alternately. In the first winding layer portion, the wire material is overlapped in a spiral shape from the outer peripheral side to the inner peripheral side. The first winding layer portion transfers to the second winding layer portion by a first connecting portion. The first connecting portion is formed by the wire material continuing from the inner peripheral side of the first winding layer portion. In the second winding layer portion, the wire material is overlapped in a spiral shape from the inner peripheral side to the outer peripheral side. The second winding layer portion transfers to the following first winding layer portion by a second connecting portion. The second connecting portion is formed by the wire material continuing from the outer peripheral side of the second winding layer portion. The first winding layer portion and the second winding layer portion are arranged to close contact.

The wire material is deformed into a helical shape by repeating two successive first deformation region and second deformation region. The first deformation region corresponds to the first winding layer portion. The wire material in the first deformation region goes around helically from the outer side to the inner side. The curvature of the curved portion in the first deformation region increases as it goes to the inner side. The second deformation region corresponds to the second winding layer portion. The wire material in the second deformation region goes around helically from the inner side to the outer side. The curvature of the curved portion in the second deformation region decreases as it goes to the outer side. At the portion where transferring from the first deformation region to the second deformation region, a third deformation point on a side close to the second deformation region runs into a first deformation point of the first deformation region. Thereby, the second winding layer portion can be formed adjacent to the first winding layer portion. At the portion where transferring from the second deformation region to the first deformation region, a sixth deformation point on a side close to the first deformation region runs into a fourth deformation point of the second deformation region. Thereby, the first winding layer portion can be formed adjacent to the second winding layer portion.

A forming device deforms the wire material into a helical shape. The forming device includes a conveyance mechanism and a deformation mechanism. The conveyance mechanism has a drive roller and a driven roller. The drive roller conveys the wire material along a longitudinal direction. The driven roller is arranged to oppose the drive roller. The deformation mechanism has a pressing roller, a fulcrum roller, and a hold roller. The pressing roller deforms the wire material to curve. The fulcrum roller is arranged to oppose the pressing roller. The hold roller is arranged at the upstream of the fulcrum roller in a conveyance direction. The wire material is held between the drive roller and the driven roller, and is conveyed in the longitudinal direction while being shaped into a straight shape. The wire material passes between the pressing roller and the fulcrum roller while contacting the hold roller. The pressing roller approaches the fulcrum roller and separates from the fulcrum roller to perform a pressing operation.

The forming device alternately performs a first deformation process and a second deformation process while continuously conveying the wire material. The first deformation process corresponds to the first deformation region. In the first deformation process, the wire material is conveyed by a length of a long side portion corresponding to the outermost circumference side, and after that, the curved portion with a predetermined curvature is formed by the pressing operation of the pressing roller. Continuously, in the first deformation process, the wire material is conveyed by a length of a short side portion, and after that, the curved portion with a predetermined curvature is formed by the pressing operation of the pressing roller. In the first deformation process, a deformation process is repeated to form the long side portion, the curved portion, the short side portion, and the curved portion. The first deformation process is to deform the wire material so that the wire material goes around in a helical shape from the outer side to the inner side. Further, in the first deformation process, the curvature of the curved portion on the inner side is deformed to be greater than the curvature of the adjacent curved portion on the outer side.

The second deformation process corresponds to the second deformation region. In the second deformation process, after forming the first deformation region, the wire material is conveyed by a length corresponding to the first connecting portion. Next, in the second deformation process, the curved portion is formed by the pressing operation by the pressing roller. Further, in the second deformation process, the wire material is conveyed by a length of a long side portion corresponding to the innermost circumference side, and after that, the curved portion with a predetermined curvature is formed by the pressing operation of the pressing roller. Continuously, in the second deformation process, the wire material is conveyed by a length of a short side portion, and after that, the curved portion with a predetermined curvature is formed by the pressing operation of the pressing roller. In the second deformation process, a deformation process is repeated to form the long side portion, the curved portion, the short side portion, and the curved portion. The second deformation process is to deform the wire material so that the wire material goes around in a helical shape from the inner side to the outer side. Further, in the second deformation process, the curvature of the curved portion on the outer side is deformed to be lesser than the curvature of the adjacent curved portion on the inner side. In the first deformation process after the second deformation process, the wire material is conveyed by a length corresponding to the second connecting portion.

Patent document 2 discloses a method for manufacturing a stator. The stator is provided to a motor. The manufacturing method includes a forming process, an array process, an arranging process, and an assembling process. The forming process forms an air core coil. In the forming process, a processing portion bend processes a coil wire into a designed shape. The processing portion includes a conveyance portion and a deformation portion. The conveyance portion holds the coil wire between two drive rolls and feeds the coil wire out from a supply portion. The conveyance portion conveys coil wire to the deformation portion while shaping the coil wire into a straight shape in a longitudinal direction. The deformation portion includes a press roll, a support roll, and a pressing roll. The support roll is arranged on one side of a conveyance path of the coil wire. The pressing roll is arranged on the other side of the conveyance path of the coil wire and moves in a direction intersecting the conveyance path. The deforming portion deforms the coil wire into a desired curvature by a pressing operation against the coil wire by the pressing roll. The coil wire passes through the deformed portion and becomes a formed body. The formed body develops in a helical shape. In the forming process, the formed body forms a coil unit. The coil unit sequentially arrays the required number of coils and crossover wires. In the case in which the stator has 3 phases and 12 cores, the coil unit includes 4 concentrated winding coils and 5 crossover wires. In the coil, straight portion and curved portion are formed alternately. The crossover wire in the coil unit circulates around a central axis of the coil. The crossover wire has the necessary length to connect coils of the same phase when the coils are arranged. In the forming process, U-phase, V-phase, and W-phase coil units are prepared.

The array process and the arranging process, arrays the coils of a U-phase, a V-phase, and a W-phase coil units in one row to the following aspect. In the above-described aspect, in the case in which the U-phase, V-phase, and W-phase coil units are arrayed in the order of arrangement in the motor and corresponding to the motor shape, crossover wires do not cross each other. The array process and the arranging process obtain a group of arrayed coils. In the arrayed coil group, all coils of the U-phase, V-phase, and W-phase coil units are fitted onto a coil support body. In the arrayed coil group, the U-phase crossover wire is located between the W-phase crossover wire and the V-phase crossover wire, the V-phase crossover wire is located between the U-phase crossover wire and the W-phase crossover wire and, the W-phase crossover wire is located between the V-phase crossover wire and the U-phase crossover wire.

In the assembling process, a divided stator core provided with an insulating member is brought into contact with an end face of the coil support body, and the coils of the arrayed coil group are attached to the divided stator core. Coils are repeatedly attached to the divided stator cores, and all coils are attached to the multiple divided stator cores. Thereby, the assembling process obtains a straight shaped stator. After that, in the assembling process, the straight shaped stator is fixed in an annular shape to obtain an annular shaped stator.

Patent Document 3 discloses a method for manufacturing a winding wire and a manufacturing device. The manufacturing method and manufacturing device deform a wire material into a helical shape to form a formed body. The formed body is compressed to form a winding wire. The winding wire becomes a coil.

CITATION LIST

Patent Literature

Patent Document 1: JPA No. 2014-93846
Patent Document 2: JPA No. 2016-63663
Patent Document 3: JPA No. 2014-93847

SUMMARY OF THE INVENTION

Problems to be Solved by the Invention

The rotary machine includes a coil having the following structure. The above-described structure is formed by concentrated winding a conductor. For example, in motors and generators as rotary machines, the coil is formed by concentrated winding the conductor around a tooth of a stator core. A rectangular conductor is sometimes adopted as the conductor to form a coil. The rectangular conductor has a rectangular cross-sectional shape in a raw material state before winding. It may be possible to improve a space factor by forming the coil with the rectangular conductor. High efficiency of rotating machines can be achieved by improving the space factor.

In the case in which the rectangular conductor is spirally wound to correspond to the outer circumferential shape of the tooth, corner portions are formed in the rectangular conductor. This corner portion connects a part of the rectangular conductor along a side surface of the tooth and a part of the rectangular conductor along an end surface of the tooth. The inventor recognizes that the rectangular conductor extends in a lengthwise direction around an outer circumference side of the corner portion and contract in the lengthwise direction around an inner circumference side of the corner portion. The inventor recognizes that in the case in which such deformation occurs, a rectangular cross-sectional shape of the rectangular conductor forming the corner portion will be deformed into the following aspect. The above-described aspect has a trapezoidal shape in which the inner circumference side is longer than the outer circumference side.

For example, assume that one coil has the following aspect. The above-described aspect includes a third coil layer and a fourth coil layer which each formed by winding one continuous rectangular conductor. The third coil layer and the fourth coil layer are connected by the above-described one rectangular conductor. The fourth coil layer contacts with a second side surface of the third coil layer at a first side surface of the fourth coil layer. The first side surface of the fourth coil layer forms a first side of a second direction perpendicular to the following first direction in the fourth coil layer, and the second side surface of the third coil layer forms a second side of the second direction in the third coil layer. The first direction is a radial direction in which the rectangular conductor overlaps in the third coil layer and the fourth coil layer. In this case, the positions of the wound rectangular conductor in the first direction are the same in the third coil layer and the fourth coil layer. The following two portions contact with the second direction on the inner circumference side and do not contact the second direction on the outer circumference side. The above-described two portions are a portion of the rectangular conductor that forms a corner portion of the third coil layer and whose cross-section shape is deformed into a trapezoidal shape, and a portion of the rectangular conductor that forms a corner portion of the fourth coil layer and whose cross-section shape is deformed into a trapezoidal shape. That is, a gap is occurred on the outer circumferential side of these two portions.

The inventor thought that if the generation of the above-mentioned gap in the coil could be suppressed, the coil could be made smaller in the second direction. It becomes possible to adopt a rectangular conductor having a large dimension in the second direction. Further, the inventor thought that it may be possible to improve the space factor. Assume that the following space is the same when the coil is attached to a predetermined portion. In this case, by downsizing the coil in the second direction, there is a possibility that more rectangular conductors can be accommodated in this space. The above-described space accommodates the rectangular conductor which forms the coil. Making a rotary machine as an example, this space is called a slot. Slots are formed between adjacent teeth in the stator core. In the case in which a coil is downsized in the second direction as in this manner, the coil can be used in a transformer as well as a rotary machine.

An object of the present invention is to provide a technique that can downsize a coil in a second direction where coil layers of the coil using a rectangular conductor are in contact with each other.

Solutions to Problems

An aspect of the present invention is a coil including: a first coil layer which is formed by winding a rectangular conductor in a spiral shape, and a second coil layer which is connected with the first coil layer by the rectangular conductor and formed by winding the rectangular conductor in a spiral shape, wherein the second coil layer contacts with a second side surface on a second side in a second direction of the first coil layer at a first side surface on a first side in the second direction of the second coil layer, the second direction being perpendicular to a radial first direction where the rectangular conductor overlaps at the first coil layer and the second coil layer, wherein the first coil layer including: a first portion, and a second portion which is continuous with the first portion and contacts with an outer peripheral surface of the first portion at an inner peripheral surface, wherein the second coil layer including: a third portion, and a fourth portion which is continuous with the third portion and contacts with an outer peripheral surface of the third portion at an inner peripheral surface, wherein the third portion is adjacent to the first portion and the second portion in the second direction in a contacting state in which the first side surface and the second side surface are in contact, wherein the fourth portion is not adjacent to the first portion in the second direction and is adjacent to the second portion in the second direction in the contacting state, wherein the outer peripheral surface of the third portion is arranged on an outer peripheral side in the first direction than the outer peripheral surface of the first portion, and on an inner peripheral side in the first direction than an outer peripheral surface of the second portion in the contacting state, wherein an outer peripheral surface of the fourth portion is arranged on the outer peripheral side in the first direction than the outer peripheral surface of the second portion in the contacting state.

The outer peripheral surface of the third portion may be arranged on the outer peripheral side in a first axial direction as the first direction than the outer peripheral surface of the first portion, and on the inner peripheral side in the first axial direction than the outer peripheral surface of the second portion in the contacting state, and wherein the outer peripheral surface of the fourth portion may be arranged on the outer peripheral side in the first axial direction than the outer peripheral surface of the second portion in the contacting state.

The outer peripheral surface of the third portion may be arranged on the outer peripheral side in a second axial direction as the first direction than the outer peripheral surface of the first portion, the second axial direction being a direction which is perpendicular to the first axial direction, and on the inner peripheral side in the second axial direction than the outer peripheral surface of the second portion in the contacting state, and wherein the outer peripheral surface of the fourth portion may be arranged on the outer peripheral side of the second axial direction than the outer peripheral surface of the second portion in the contacting state.

Another aspect of the present invention is a rotary machine including: a rotor, and a stator, wherein the stator including: any of the above-mentioned coils, and the stator core which is formed by laminating steel plates and includes a yoke, and a tooth which protrudes in the second direction from the yoke towards a side of the rotor, wherein the coil is provided to the tooth.

According to the above-mentioned coil and rotating machine, the first coil layer and the second coil layer can be brought into close contact in the second direction. The coil can be downsized in the second direction.

Advanced Effects of the Invention

According to the present invention, it is possible to downsize the coil in the second direction where the coil layers of the coil using rectangular conductors are in contact with each other.

BRIEF DESCRIPTION OF THE DRAWINGS

FIG. 3 is a perspective view which shows examples of schematic structures of a yoke piece, a tooth, a coil, and an insulating member. The upper row shows individually the tooth, the coil, and the insulating member. The middle row shows the state in which the coil is attached to the tooth via the insulating member. The lower row shows individually the yoke piece.

DESCRIPTION OF EMBODIMENTS

Figure 1:
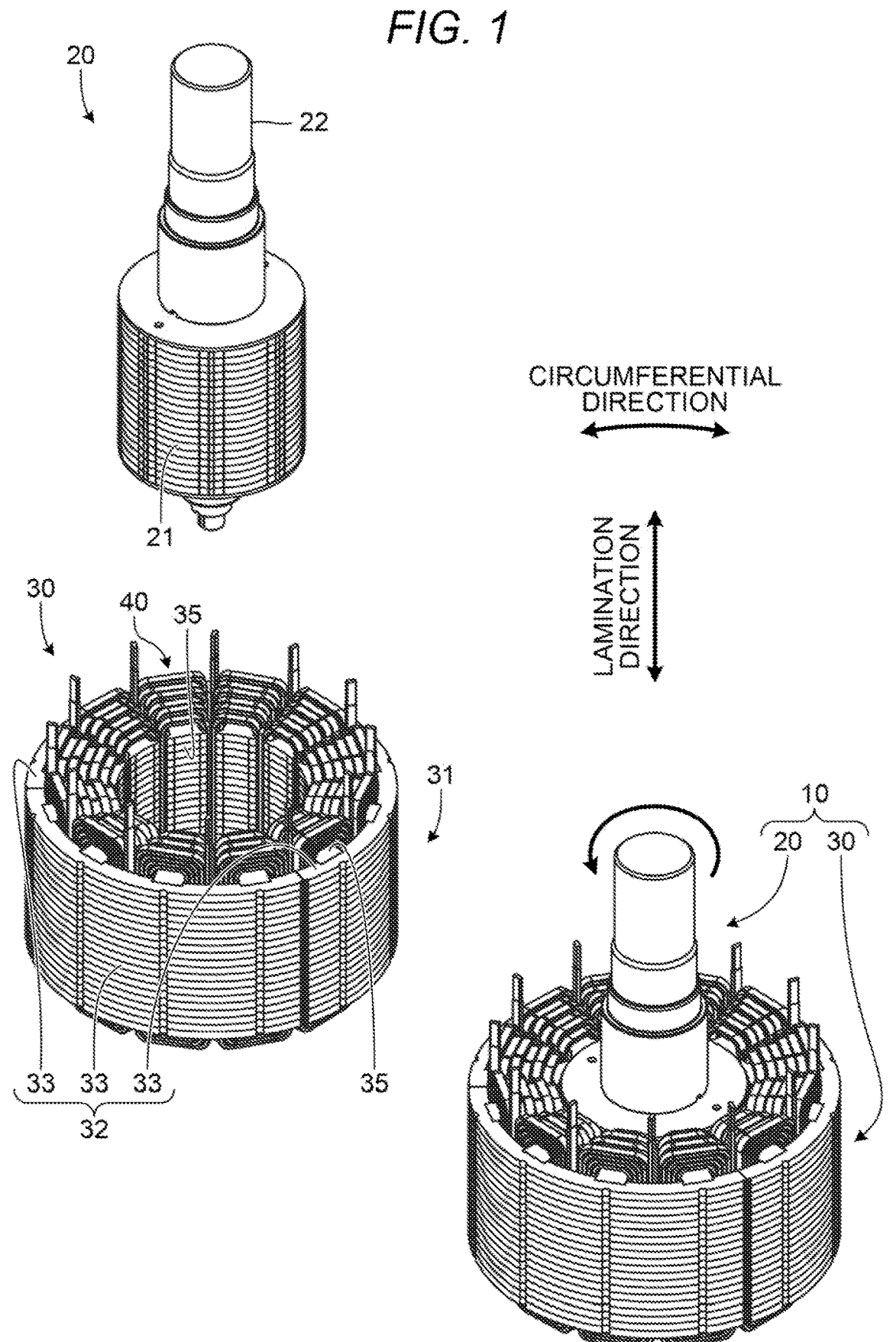
FIG. 1 is a perspective view which shows examples of schematic structures of a motor as a rotary machine, a rotor, and a stator. The upper row shows the rotor. The middle row shows the stator. The lower row shows the motor.

Embodiments for carrying out the present invention will be described with reference to the drawings. The present invention is not limited to the configurations described below, and various configurations can be adopted based on the same technical idea. For example, a part of the configurations shown below may be omitted or may be replaced by another configuration. The present invention may include another configuration. The drawings schematically show a predetermined configuration. In each drawing, correspondence with another drawing or correspondence with a numerical value which will be described later specifying the configuration in the drawing may not be accurate in some cases. Hatching indicates a cut surface.

<Motor 10>

A motor 10 as a rotary machine will be described with reference to FIGS. 1 to 5. The motor 10 is installed in various products. For example, the motor 10 is used as a drive source for electric vehicles. Examples of electric vehicles include electric automobiles, electric bicycles, electric wheelchairs, electric carts, and electric catering vehicles. Electric automobiles include hybrid vehicles. The motor 10 includes a rotor 20 and a stator 30 (see FIGS. 1 and 2). In the embodiment, an inner rotary type brushless motor is exemplified as the motor 10.

Figure 2:
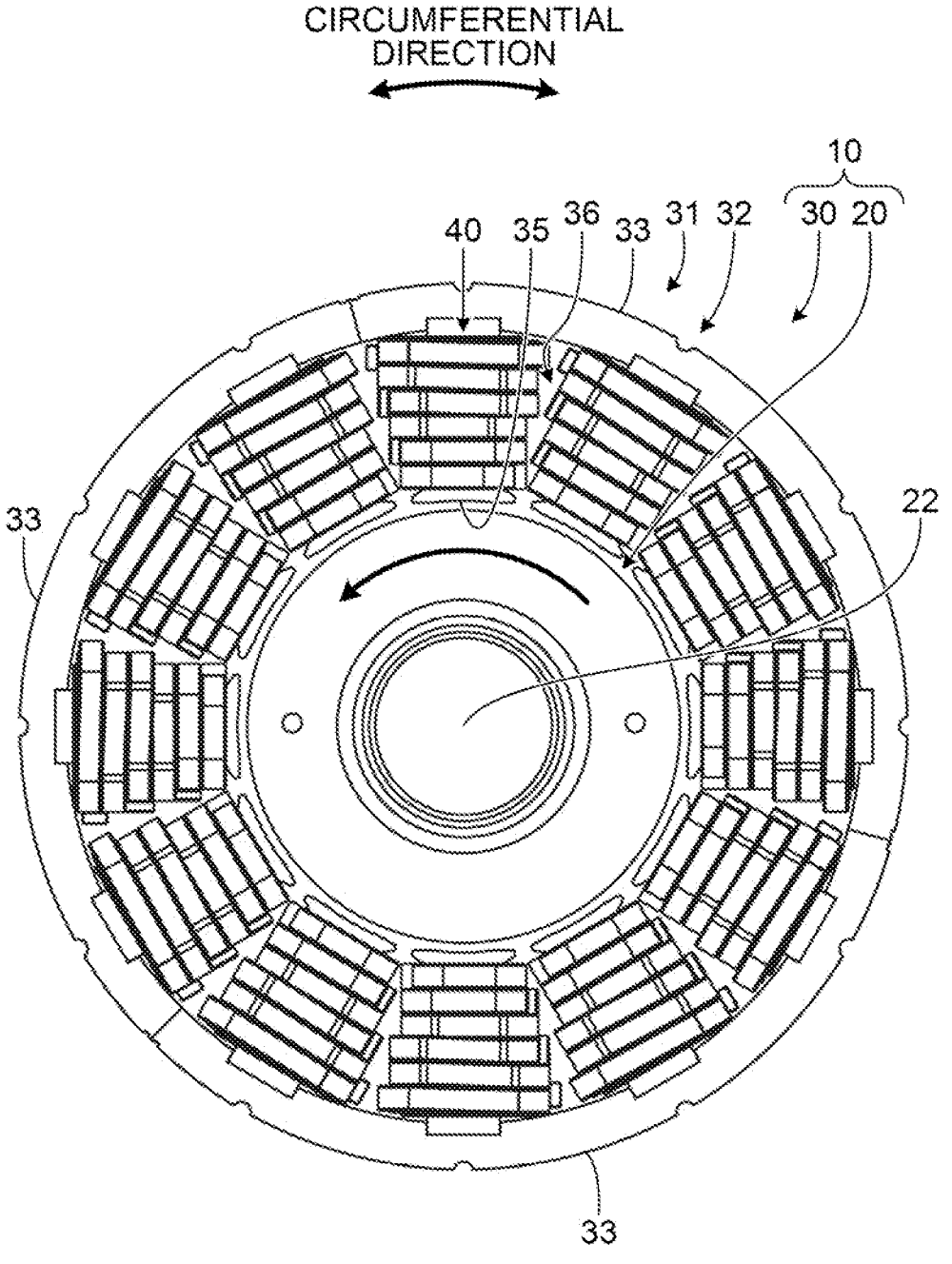
FIG. 2 is a plan view which shows the motor of FIG. 1.

The rotor 20 includes a rotor core 21, a plurality of permanent magnets, and a shaft 22. In FIGS. 1 and 2, the illustration of the permanent magnets is omitted. For example, the rotor core 21 is formed by laminating punched steel plates while punching the steel plates with a press machine. As the steel plate, an electromagnetic steel plate is adopted. The rotor core 21 is provided with the plurality of permanent magnets. For example, the plurality of permanent magnets is each housed in a plurality of spaces formed in the rotor core 21. In the case in which the rotor 20 is such a type of rotor, the motor 10 is referred to as an IPM (Interior Permanent Magnet) motor. The plurality of permanent magnets may be provided on an outer peripheral surface of the rotor core 21. In the case in which the rotor 20 is such a type of rotor, the motor 10 is referred to as a SPM (Surface Permanent Magnet) motor.

The shaft 22 is fixed to a through hole formed in the central portion of the rotor core 21. Bearings are attached to the shaft 22 on both sides of the rotor core 21. The bearings are supported by support portions. For example, the support portions are provided on the stator 30 or provided on a housing which supports the stator 30. In FIGS. 1 and 2, the illustration of the bearings, the support portions, and the housing is omitted. The shaft 22 serves as a rotation shaft of the rotor 20. The rotor 20 rotates about the shaft 22. The rotor 20 is the same as the rotor provided to a known motor (rotary machine). Therefore, other descriptions of the rotor 20 will be omitted.

In the embodiment, a circumference direction with the shaft 22 (rotational axis of the rotor 20) as the center is referred to as a "circumferential direction". The circumferential direction includes rotation direction and counter-rotation direction. The rotor 20 rotates in the rotation direction. The following arrow shown in the lower row of FIG. 1 and in FIG. 2 show the rotation direction. The above-described arrow is the circular arc arrow shown above the rotor 20 in the lower row of FIG. 1, and the circular arc shown in the inner part of the rotor 20 in FIG. 2. The counter-rotation direction is opposite to the rotation direction. A radiation direction with the shaft 22 (rotational axis of the rotor 20) as the center is referred to as a "radial direction".

The stator 30 includes a stator core 31, and a plurality of coils 40 (see FIGS. 1 and 2). Further, the stator 30 includes insulator members 60 (see FIGS. 3 and 4). In FIGS. 1 and 2, the illustration of the insulator member 60 is omitted. The stator core 31 includes a yoke 32, and a plurality of teeth 35 (see FIG. 2). The plurality of teeth 35 in the internal rotation type motor 10 protrudes to the inner side of the radial direction at the inner peripheral of the yoke 32. In the stator core 31, number of slots 36 is formed as the same number of the teeth 35. The slot 36 is a space formed between the adjacent teeth 35. The number of slots of the stator 30 is appropriately determined in consideration of the following points. The above-described points are, for example, the performance required for the motor 10.

In the embodiment, the stator core 31 has an aspect in which the stator core 31 is divided into the yokes 32 and the plurality of teeth 35 (see FIG. 3). The number of the teeth 35 is twelve (see FIG. 2). In this case, the number of the slot is twelve. In the stator core 31, the twelve teeth 35 are provided at an equal angle interval. The yoke 32 has an aspect in which three yoke pieces 33 are equally divided (see FIGS. 2 to 4). In one yoke piece 33, four teeth 35 are provided (see FIG. 4). The stator core 31 is formed by attaching four teeth 35 to one yoke piece 33, and assembling three yoke pieces 33 in an annular manner (see FIGS. 1 to 4). The number of the teeth 35, the division number of the annular yoke 32, and the number of the teeth 35 corresponding to one yoke piece 33 may be a different aspect from the embodiment. These numbers in the embodiment are examples.

Figure 4:
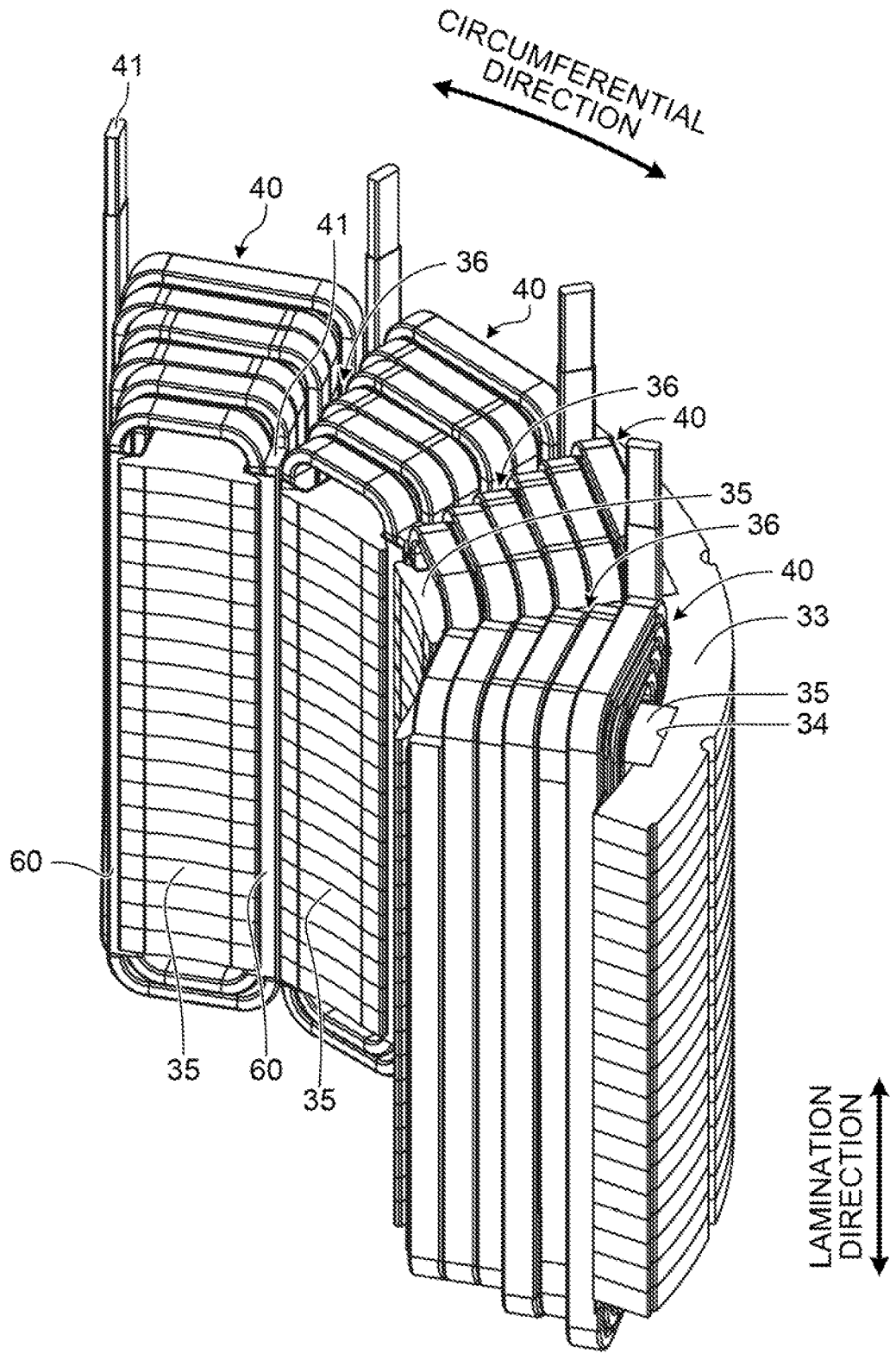
FIG. 4 is a perspective view which shows an example of a schematic structure of a part of the stator. The figure shows the state in which four teeth with coils attached via the insulating member are assembled to one yoke piece.

The yoke piece 33 includes mounting grooves 34 (see FIGS. 3 and 4). The mounting grooves 34 are provided on the inner side in the radial direction in which the teeth 35 are provided. Outer side end in the radial direction of the tooth 35 are fitted to the mounting groove 34. In yoke 33, a first engaging portion may be provided to an inner surface of the mounting groove 34, and in teeth 35, a second engaging portion may be provided to the outer side end in the radial direction. The second engaging portion engages with the first engaging portion. That is, the tooth 35 is attached to the yoke piece 33 in a state in which the outer side end in the radial direction engages the inner surface of the mounting groove 34. In the embodiment, the illustration of the first engaging portion and the second engaging portion is omitted.

For example, the yoke piece 33 and the tooth 35 are formed by laminating punched steel plates while punching the steel plates with a press machine. As the steel plate, an electromagnetic steel plate is adopted. In the embodiment, a direction in which the steel plates are laminated in the yoke piece 33 and the tooth 35 is referred to as a "lamination direction". In the case the stator core 31 is formed by a plurality of yoke pieces 33 and a plurality of teeth 35 (see FIGS. 1 to 4), the lamination direction may be the direction in which the steel plates are laminated in the stator core 31. The lamination direction coincides with the direction in which the steel plates are laminated in the rotor core 21. Assume that the yoke piece 33 includes the first engaging portion at the inner surface of the mounting groove 34 and the tooth 35 include the second engaging portion at the outer side end in the radial direction. In this case, the attachment of the tooth 35 to the yoke piece 33 can be carried out from one side of the lamination direction.

The coil 40 is formed by a rectangular conductor. The plurality of the coils 40 is formed by the same rectangular conductor, and has the same coil structure (see FIGS. 1, 2, and 4). The coil structure that is adopted by the plurality of coils 40 is the same as the as the winding wire structure which is disclosed in the above-mentioned Patent Document 1 except the point that the coil 40 adopts a staggered structure (see FIGS. 6, 7, and 8 upper row mentioned later). The staggered structure will be mentioned later in the descriptions of the coil structure of coil 40 mentioned later. In the embodiment, the coil structure of the coil 40 including the staggered structure is simply referred to as a "coil structure".

The coil 40 is provided to the tooth 35 via the insulating members 60 (see FIGS. 3 and 4). The insulating member 60 has electric insulation properties and electrically insulates the tooth 35 and the coil 40. That is, in the stator 30, the plurality of coils 40 are electrically insulated with the stator core 31 by the insulating members 60. In the embodiment, the insulating members 60 is provided inside the slot 36 on both side surfaces in the circumferential direction of the tooth 35. In this case, the insulating member 60 is called a slot insulating paper. The slot insulating paper is also adopted to a stator of a known motor (rotary machine). In addition, in the stator 30, an insulating structure including an insulator which is adopted to a known stator may be adopted. The insulator may be a resin molded product. In the stator 30, an insulating structure including the same insulating member as in such known stator can be adopted. The stator 30 may adopt an insulating structure including both the slot insulating paper and the insulator. Therefore, other descriptions of the following point will be omitted. The above-described point relates to the insulating member 60. Further, the above-mentioned point relates to the electrical insulating structure of the stator core 31 and the coil 40 which is using the insulating member 60.

Examples of the winding method for forming the coil 40 include the methods disclosed in the above-mentioned Patent Documents 1 and 3. This method deforms the wire member into a helical shape and forms the coil. That is, the coil 40 of the embodiment can be manufactured using a winding machine similar to the machines of Patent Documents 1 and 3, and by a winding method according to the methods disclosed therein. Therefore, the descriptions which relates to the winding method of the coil 40 will be omitted as appropriate.

Figure 5:
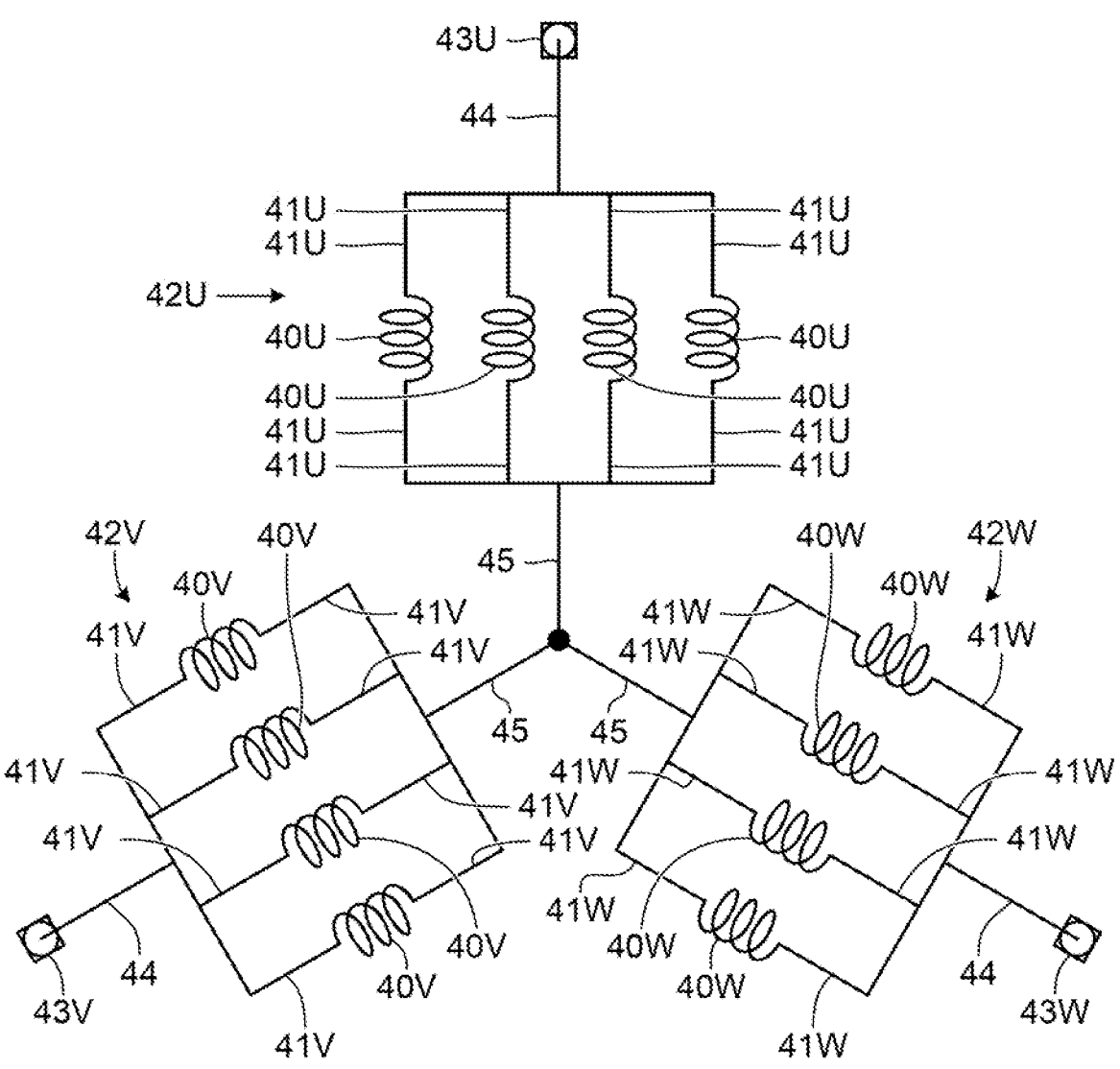
FIG. 5 is a connection diagram which shows an example of a connection aspect in which a plurality of coils is connected.

The plurality of coils 40 are classified into any of U-phase, V-phase, and W-phase (see FIG. 5). In the embodiment, the U-phase of the coil 40 is referred to as a "coil 40U," the V-phase of the coil 40 is referred to as a "coil 40V," and the W-phase of the coil 40 is referred to as a "coil 40W". In the case in which coils 40U, 40V, and 40W are not distinguished, or in the case in which they are collectively referred to, they are referred to as a "coil 40". The rectangular conductor forming the coil 40 is drawn out at the winding start side and the winding end side of the coil 40, respectively (see FIGS. 1 to 4). In the embodiment, the drawn out rectangular conductor parts are referred to as a "lead wires 41U, 41V, 41W" (see FIG. 5). The lead wire 41U is formed by the rectangular conductor forming the coil 40U. The lead wire 41V is formed by the rectangular conductor forming the coil 40V. The lead wire 41W is formed by the rectangular conductor forming the coil 40W. In the case in which the lead wires 41U, 41V, and 41W are not distinguished, or in the case in which they are collectively referred to, they are referred to as a "lead wires 41". In the embodiment, the lead wire 41 of the two lead wires 41 which is outer in the radial direction is shown to be longer than the lead wire 41 which is inner in the radial direction.

The plurality of coils 40U are connected on the side of one predetermined lead wire 41U of the two lead wires 41U (see FIG. 5). The remaining one lead wire 41U of the two lead wires 41U is connected to a connection terminal 43U of the U-phase. The plurality of coils 40U form a U-phase coil unit 42U. The plurality of coils 40V are connected on the side of one predetermined lead wire 41V of the two lead wires 41V (see FIG. 5). The remaining one lead wire 41V of the two lead wires 41V is connected to a connection terminal 43V of the V-phase. The plurality of coils 40V form a V-phase coil unit 42V. The plurality of coils 40W are connected on the side of one predetermined lead wire 41W of the two lead wires 41W (see FIG. 5). The remaining one lead wire 41W of the two lead wires 41W is connected to a connection terminal 43W of the W-phase. The plurality of coils 40W form a W-phase coil unit 42W.

In the embodiment, in the case in which the coil units 42U, 42V, and 42W are not distinguished, or in the case in which they are collectively referred to, they are referred to as a "coil unit 42". In the case in which the connection terminals 43U, 43V, and 43W are not distinguished, or in the case in which they are collectively referred to, they are referred to as a "connection terminal 43". Examples of connection methods for connecting the lead wire 41 and the connection terminal 43 include caulking and welding.

The connection between the lead wire 41 and the connection terminal 43 may be carried out through a first coupling conductor 44 (see FIG. 5). The first coupling conductor 44 may be made of a rectangular conductor separate from the lead wire 41. The first coupling conductor 44 is connected to the lead wire 41 and the connection terminal 43 and electrically connects them. An example of the following first connection method is welding. The first connection method connects the lead wire 41 and the first coupling conductor 44. The following second connection method is the same as the connection between the lead wire 41 and the connection terminal 43. The second connection method connects the connection terminal 43 and the first coupling conductor 44. It is preferable that the first coupling conductor 44 is made of the same rectangular conductor as the coil 40. However, the connection between the lead wire 41 and the connection terminal 43 may be in the following aspect. In the above-described aspect, the plurality of lead wires 41U are each drawn out to the following length and directly connected to the connection terminal 43U. In the above-described aspect, the plurality of lead wires 41V are each drawn out to the following length and directly connected to the connection terminal 43V. In the above-described aspect, the plurality of lead wires 41W are each drawn out to the following length and directly connected to the connection terminal 43W. The above-described length is determined in consideration of the path to the connection terminal 43 having the same phase as the lead wire 41.

In the stator 30, four coils 40 forming the coil unit 42 for one phase are parallel connected, and the coil units 42U, 42V, and 42W are star connected (see FIG. 5). The black circle shown in the center of FIG. 5 indicates a neutral point. Parallel connection of the four coils 40 of the same phase and star connection of the coil units 42U, 42V, and 42W may be carried out through a second coupling conductor 45 made of a rectangular conductor separate from the lead wire 41 (see FIG. 5). The second coupling conductor 45 is connected to the lead wires 41 of the four coils 40 of the same phase, and electrically connects the coil units 42U, 42V, and 42W. The following third connection method is the same as the connection between the lead wire 41 and the first coupling conductor 44. The third connection method connects the lead wire 41 and the second coupling conductor 45.

However, the connection aspect of the coil units 42U, 42V, and 42W does not have to be star connection. An example of a connection aspect different from star connection is delta connection. The connection aspect of the coil units 42U, 42V, and 42W is determined as appropriate in consideration of various conditions. In FIGS. 1, 2, and 4, illustration of the first coupling conductor 44 and the second coupling conductor 45 is omitted.

<Coil Structure>

The coil structure will be explained with reference to FIGS. 1 to 4 and 6. The coil 40 includes a plurality of coil layers 50. In the embodiment, the coil 40 includes six coil layers 50 (see FIGS. 3 and 6). The number of the coil layers 50 provided in the coil 40 may be greater than or equal to 2 and less than or equal to 5, or may be greater than or equal to 7. The number of the coil layers 50 in the coil 40 is determined as appropriate in consideration of various conditions. In the embodiment, the six coil layers 50 are referred to as "coil layers 51, 52, 53, 54, 55, and 56." In the case in which the coil layers 51, 52, 53, 54, 55, and 56 are not distinguished, or in the case in which they are collectively referred to, they are referred to as a "coil layer 50."

The coil layer 50 has a structure with the rectangular conductor wound in a spiral shape (see the upper row of FIG. 3). A spiral means "a shape of a plane curve wound in helical" (Kojien 7th edition; Iwanami Shoten). The number of turns of the rectangular conductor in some or all of the plurality of coil layers 50 may be different (see FIGS. 1 to 4), or may be the same (see FIG. 6 and the upper row of FIG. 7 mentioned later). The number of turns of the rectangular conductor in the plurality of coil layers 50 is appropriately determined in consideration of various conditions.

In the embodiment, a radiation direction in which the rectangular conductor overlaps in the coil layers 51, 52, 53, 54, 55, and 56 is referred to as a "first direction", and a direction perpendicular to the first direction is referred to as a "second direction". One side in the second direction is referred to as a "first side" and the other side in the second direction is referred to as a "second side". The second direction may coincide with the radial direction in the state of the motor 10 (rotary machine). In the motor 10, the second direction coincides with the radial direction. The state of the motor 10 (rotary machine) includes the state of the stator 30. Further, the state of the motor 10 (rotary machine) and the state of the stator 30 include a state in which the coil 40 is provided to the tooth 35. In the case in which the first side in the second direction is the inner side in the radial direction, the second side in the second direction is the outer side in the radial direction (see FIG. 3). In contrast, in the case in which the first side in the second direction is the outer side in the radial direction, the second side in the second direction is the inner side in the radial direction.

Figure 6:
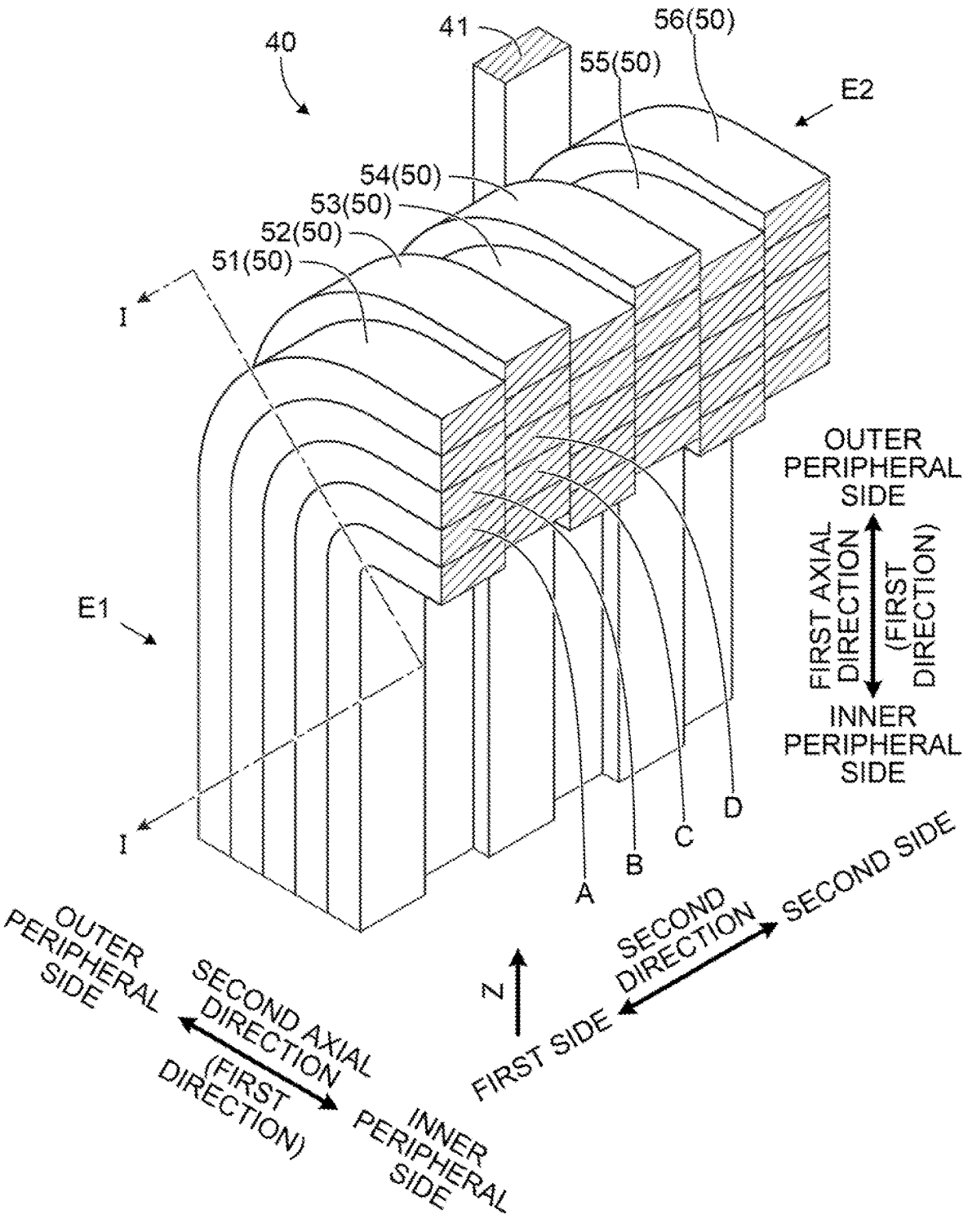
FIG. 6 is a partial perspective view which shows an example of a schematic structure of the coil. The figure shows a corner portion of the coil.

In the embodiment, the coil layers 51, 52, 53, 54, 55, and 56 are provided in this order from the first side to the second side in the second direction (see the upper row of FIG. 3 and FIG. 6). Side surfaces of the coil layers 51, 52, 53, 54, 55, and 56 on the first side in the second direction are referred to as a "first side surface", and side surfaces of the coil layers 51, 52, 53, 54, 55, and 56 on the second side in the second direction are referred to as a "second side surface". The first side surface of the coil layer 50 means the first side surfaces of some or all of the coil layers 51, 52, 53, 54, 55, and 56. The second side surface of the coil layer 50 means the second side surfaces of some or all of the coil layers 51, 52, 53, 54, 55, and 56.

In the embodiment, the following "first axial direction" and "second axial direction" are defined as the radial first direction. The second axial direction is perpendicular to the first axial direction. In the case in which the motor 10 is used as a reference, assume that the first axial direction coincides with the lamination direction, and assume that the second axial direction is perpendicular to both the lamination direction and the radial direction.

The coil layer 52 is connected with the coil layer 51 by the rectangular conductor on the inner peripheral side of the coil 40. The first side surface of the coil layer 52 contacts with the second side surface of the coil layer 51 (see the upper row of FIG. 3 and FIG. 6). The coil layer 53 is connected with the coil layer 52 by the rectangular conductor on the outer peripheral side of the coil 40. The first side surface of the coil layer 53 contacts with the second side surface of the coil layer 52 (see the upper row of FIG. 3 and FIG. 6). The coil layer 54 is connected with the coil layer 53 by the rectangular conductor on the inner peripheral side of the coil 40. The first side surface of the coil layer 54 contacts with the second side surface of the coil layer 53 (see the upper row of FIG. 3 and FIG. 6). The coil layer 55 is connected with the coil layer 54 by the rectangular conductor on the outer peripheral side of the coil 40. The first side surface of the coil layer 55 contacts with the second side surface of the coil layer 54 (see the upper row of FIG. 3 and FIG. 6). The coil layer 56 is connected with the coil layer 55 by the rectangular conductor on the inner peripheral side of the coil 40. The first side surface of the coil layer 56 contacts with the second side surface of the coil layer 55 (see the upper row of FIG. 3 and FIG. 6). In the embodiment, illustration of the rectangular conductor connecting the two coil layers 50 is omitted except for the following part. The above-described part is a rectangular conductor that connects the coil layers 51 and 52, and a rectangular conductor that connects the coil layers 53 and 54 (see "inner peripheral side of coil 40" in the upper row of FIG. 3). The arrangement of the rectangular conductor connecting the two coil layers 50 with respect to the coil 40 is appropriately determined in consideration of various conditions.

<Staggered Structure>

The staggered structure adopted by the coil structure will be described with reference to FIGS. 3 and 6, and the upper row of FIG. 8. However, this description focuses on the coil layers 51 and 52 that are in contact with each other in the second direction. In the coil 40, the coil layers 52 and 53, the coil layers 53 and 54, the coil layers 54 and 55, and the coil layers 55 and 56 are in contact with each other in the second direction similarly to the coil layers 51 and 52. Although the descriptions will be omitted, the same structure as the coil layers 51 and 52 is also realized in the coil layers 52 and 53, the coil layers 53 and 54, the coil layers 54 and 55, and the coil layers 55 and 56.

In this description, the state in which the first side surface of the coil layer 52 and the second side surface of the coil layer 51 are in contact is referred to as a "contacting state". The portions of the coil layer 51 are referred to as a "first portion A" and "second portion B", and the portions of the coil layer 52 are referred to as a "third portion C" and "fourth portion D" (see FIGS. 6, 7, and the upper row of FIG. 8). The first portion A forms the second layer of the coil layer 51, and the second portion B forms the third layer of the coil layer 51. The third portion C forms the second layer of the coil layer 52, and the fourth portion D forms the third layer of the coil layer 52. However, in the coil layers 51 and 52, the first portion A, the second portion B, the third portion C, and the fourth portion D are examples for explanation. In the two coil layers 50 adjacent to each other in the second direction, four portions corresponding to the first portion A, the second portion B, the third portion C, and the fourth portion D can be set arbitrarily within a range that satisfies the conditions described below.

Figure 7:
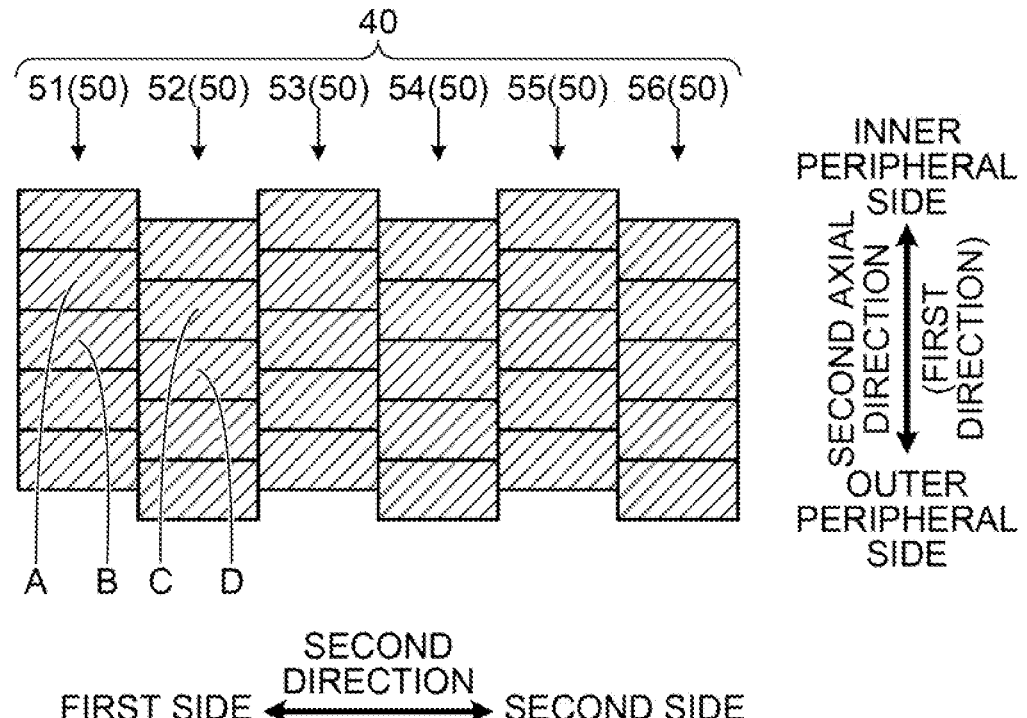
FIG. 7 is a cross-sectional view taken along arrow Z in FIG. 6.
Figure 8:
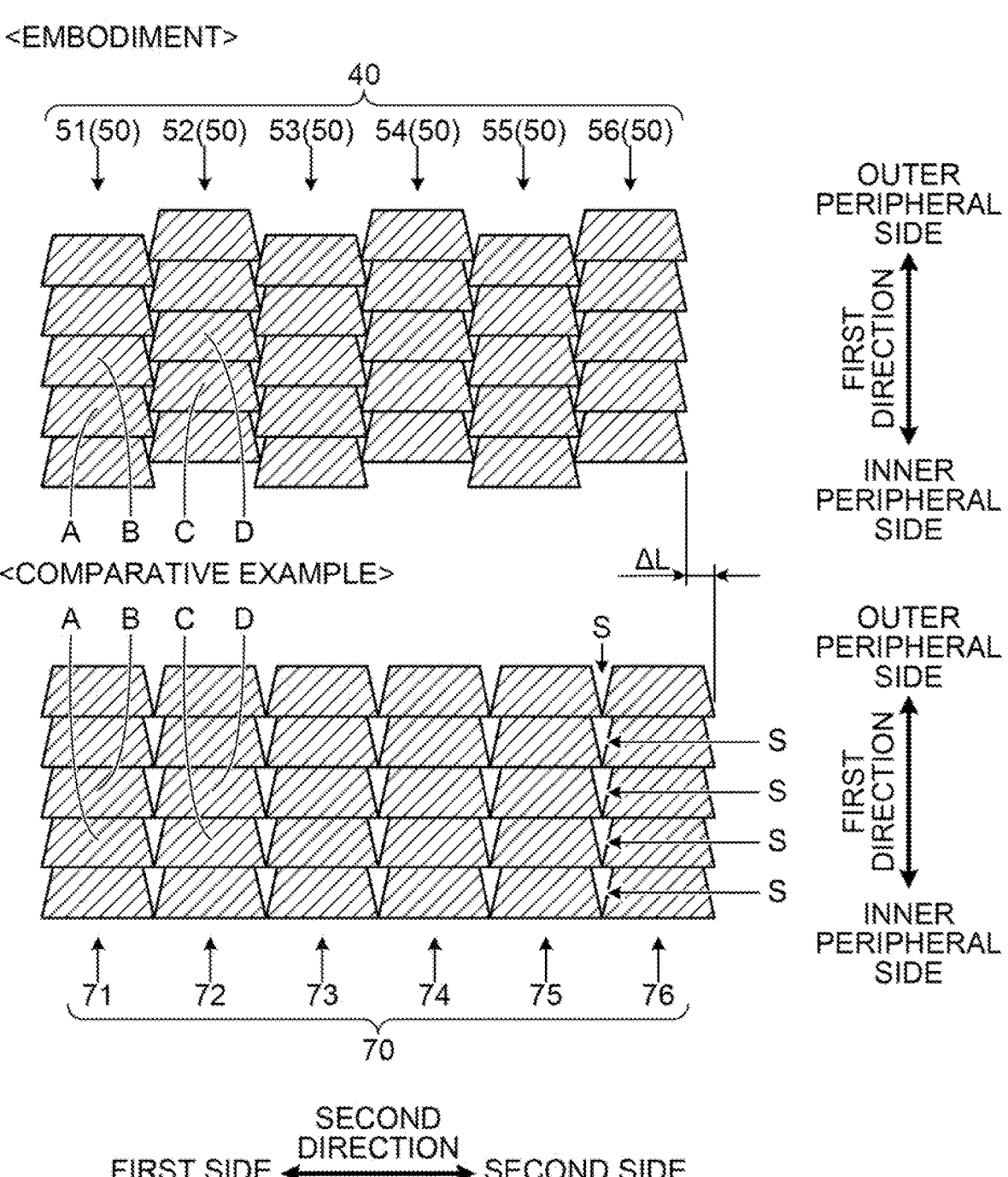
FIG. 8 is a cross-sectional view comparing the arrangement of rectangular conductor at the corner portions of the coils. The cutting position corresponds to line I-I in FIG. 6. The upper row corresponds to an embodiment of the coil. The lower row corresponds to a comparing example of a coil.

The second portion B is continuous with the first portion A and contacts with the outer peripheral surface of the first portion A at its inner peripheral surface (see FIGS. 6, 7, and the upper row of FIG. 8). In other words, the first portion A is continuous with the second portion B and contacts with the inner peripheral surface of the second portion B at its outer peripheral surface. The fourth portion Dis continuous with the third portion C and contacts with the outer peripheral surface of the third portion C at its inner peripheral surface (see FIGS. 6, 7, and the upper row of FIG. 8). In other words, the third portion C is continuous with the fourth portion D and contacts with the inner peripheral surface of the fourth portion D at its outer peripheral surface.

The third portion C is adjacent to the first portion A and the second portion B in the second direction in the contacting state (see FIGS. 6, 7, and the upper row of FIG. 8). The outer peripheral surface of the third portion C is arranged on the outer peripheral side in the first direction than the outer peripheral surface of the first portion A, and on the inner peripheral side in the first direction than the outer peripheral surface of the second portion B in the contacting state. That is, the outer peripheral surface of the third portion C is arranged on the outer peripheral side in the first axial direction than the outer peripheral surface of the first portion A and on the inner peripheral side in the first axial direction than the outer peripheral surface of the second portion B in the contacting state (see FIG. 6). Further, the outer peripheral surface of the third portion C is arranged on the outer peripheral side in the second axial direction than the outer peripheral surface of the first portion A, and on the inner peripheral side in the second axial direction than the outer peripheral surface of the second portion B in the contacting state (see FIG. 7).

The fourth portion D is not adjacent to the first portion A in the second direction, and is adjacent to the second portion B in the second direction in the contacting state (see FIGS. 6, 7, and the upper row of FIG. 8). The outer peripheral surface of the fourth portion D is arranged on the outer peripheral side in the first direction than the outer peripheral surface of the second portion B in the contacting state. That is, the outer peripheral surface of the fourth portion D is arranged on the outer peripheral side in the first axial direction than the outer peripheral surface of the second portion B in the contacting state (see FIG. 6). Further, the outer peripheral surface of the fourth portion D is arranged on the outer peripheral side in the second axial direction than the outer peripheral surface of the second portion B in the contacting state (see FIG. 7).

That is, in the coil 40, the rectangular conductor of the next first coil layer is arranged to be shifted in the first direction from the rectangular conductor of the next second coil layer (staggered structure, see FIGS. 6, 7, and the upper row of FIG. 8). The first coil layer and the second coil layer of the coil 40 are two coil layers 50 adjacent to each other in the second direction among the coil layers 51, 52, 53, 54, 55, and 56. In the coil 40, the displacement in the first direction between the rectangular conductor of the first coil layer and the rectangular conductor of the second coil layer includes a displacement in the first axis direction and a displacement in the second axis direction (see FIGS. 6 and 7).

Assume that the coil 40 is formed according to the winding method disclosed in Patent Documents 1 and 3. In a case in which winding a rectangular conductor and sequentially forming a first axial portion E1, a corner portion, and a second axial portion E2 of the first portion A, the second portion B, the third portion C, and the fourth portion D, the rectangular conductor is fed by a predetermined feed amount. The first axial portion E1 runs along the first axial direction in the first portion A, the second portion B, the third portion C, and the fourth portion D. The second axial portion E2 runs along the second axial direction in the first portion A, the second portion B, the third portion C, and the fourth portion D. The corner portion connects the first axial portion E1 and the second axial portion E2. The feed amount of the rectangular conductor in the winding method is determined appropriately by considering various conditions. For example, in the case in which forming the first axial portion E1 and the second axial portion E2 in the first portion A, the second portion B, the third portion C, and the fourth portion D, the relationship between the feed amounts of the rectangular conductor may be "first portion A=second portion B, third portion C=fourth portion D, first portion A<third portion C". For example, in the case in which forming the corner portion in the first portion A, the second portion B, the third portion C, and the fourth portion D, the relationship between the feed amounts of the rectangular conductor may be "first portion A<third portion C<second portion B<fourth portion D".

Effect of Embodiment

According to the embodiment, the following effects can be obtained.

(1) The coil 40 includes the plurality of coil layers 50 (see the upper row of FIG. 3 and FIG. 6). The coil layer 50 is formed by winding the rectangular conductor in a spiral state. The plurality of coil layers 50 is connected by the rectangular conductor. The rectangular conductor which connects the coil layers 50 is the same rectangular conductor as the coil layer 50, and is continuous with the rectangular conductor forming the coil layer 50. For example, the coil layer 52 of the plurality of coil layers 50 contacts with the second side surface on the second side in the second direction of the coil layer 51 of the plurality of coil layers 50 at the first side surface on the first side in the second direction. The coil layer 51 includes the first portion A and the second portion B (see FIGS. 6, 7 and the upper row of FIG. 8). The second portion B is continuous with the first portion A and contacts with the outer peripheral surface of the first portion A at the inner peripheral surface. The coil layer 52 includes the third portion C and the fourth portion D (see FIGS. 6, 7 and the upper row of FIG. 8). The fourth portion D is continuous with the third portion C and contacts with the outer peripheral surface of the third portion C at the inner peripheral surface.

The third portion C is adjacent to the first portion A and the second portion B in the second direction in the contacting state (see FIGS. 6, 7 and the upper row of FIG. 8). The fourth portion D is not adjacent to the first portion A in the second direction, and is adjacent to the second portion B in the second direction (see FIGS. 6, 7, and the upper row of FIG. 8). The outer peripheral surface of the third portion C is arranged on the outer peripheral side in the first direction than the outer peripheral surface of the first portion A, and on the inner peripheral side in the first direction than the outer peripheral surface of the second portion B in the contacting state (see FIGS. 6, 7, and the upper row of FIG. 8). The outer peripheral surface of the fourth portion D is arranged on the outer peripheral side in the first direction than the outer peripheral surface of the second portion B in a contacting state (see FIGS. 6, 7, and the upper row of FIG. 8).

The outer peripheral surface of the third portion C is arranged on the outer peripheral side in the first axial direction than the outer peripheral surface of the first portion A and on the inner peripheral side in the first axial direction than the outer peripheral surface of the second portion B in the contacting state (see FIG. 6). The outer peripheral surface of the fourth portion D is arranged on the outer peripheral side in the first axial direction than the outer peripheral surface of the second portion B in the contacting state (see FIG. 6). The outer peripheral surface of the third portion C is arranged on the outer peripheral side in the second axial direction than the outer peripheral surface of the first portion A, and on the inner peripheral side in the second axial direction than the outer peripheral surface of the second portion B in the contacting state (see FIG. 7). The outer peripheral surface of the fourth portion D is arranged on the outer peripheral side in the second axial direction than the outer peripheral surface of the second portion B in the contacting state (see FIG. 7). The first axial direction and the second axial direction are included in the radial first direction. That is, the first axial direction and the second axial direction are included in a virtual plane that includes the first direction. Further, the second axial direction is perpendicular to the first axial direction.

In the case in which the rectangular conductor is spirally wound to correspond to the outer circumferential shape of the tooth 35, as mentioned above, corner portion is formed at the part where the first axial portion E1 and the second axial portion E2 is connected in the rectangular conductor (see FIG. 6). The inventor recognizes that the rectangular conductor extends in the lengthwise direction around the outer circumference side of the corner portion and contract in the lengthwise direction around the inner circumference side of the corner portion. The inventor recognizes that in the case in which such deformation occurs, the rectangular cross-sectional shape of the rectangular conductor forming the corner portion will be deformed into the following aspect (see FIG. 8). The above-described aspect has a trapezoidal shape in which the inner circumference side is longer than the outer circumference side.

Assume that a coil is the coil 70 (see the lower row of FIG. 8). The coil 70 is a comparative example with respect to coil 40 of the embodiment. The coil 70 includes coil layers 71, 72, 73, 74, 75, and 76 formed by winding one continuous rectangular conductor, respectively. The coil layers 71, 72, 73, 74, 75, and 76 are connected by the above-described one rectangular conductor. The coil layers 71, 72, 73, 74, 75, and 76 are provided in this order from the first side to the second side in the second direction (see the lower row of FIG. 8). The first side surface of the coil layer 72 contacts with the second side surface of the coil layer 71. The first side surface of the coil layer 73 contacts with the second side surface of the coil layer 72. The first side surface of the coil layer 74 contacts with the second side surface of the coil layer 73. The first side surface of the coil layer 75 contacts with the second side surface of the coil layer 74. The first side surface of the coil layer 76 contacts with the second side surface of the coil layer 75. The first side surface of the coil layers 71, 72, 73, 74, 75, and 76, similarly to the first side surface of the coil layer 50, forms the first side of the coil layers 71, 72, 73, 74, 75, 76 in the second direction. The second side surface of the coil layers 71, 72, 73, 74, 75, and 76, similarly to the second side surface of the coil layer 50, forms the second side of the coil layers 71, 72, 73, 74, 75, and 76 in the second direction. In the coil layers 71, 72, 73, 74, 75, and 76, the positions of the rectangular conductor in the first direction are the same. In this case, the following two portions contact with the second direction on the inner circumference side and do not contact the second direction on the outer circumference side. The above-described two portions are a portion of the rectangular conductor that forms a corner portion of the third coil layer and whose cross-section shape is deformed into a trapezoidal shape, and a portion of the rectangular conductor that forms a corner portion of the fourth coil layer and whose cross-section shape is deformed into a trapezoidal shape. The third coil layer and the fourth coil layer are two coil layers adjacent to each other in the second direction among the coil layers 71, 72, 73, 74, 75, and 76. That is, a gap S is occurred on the outer peripheral side of these two portions (see the lower row of FIG. 8).

According to the coil 40, it is possible to suppress the generation of the gap S that occurs at the corner portion of the coil 70 of the comparative example mentioned above (see the upper row of FIG. 8). That is, in the coil 40, the coil layers 50 adjacent in the second direction can be brought into close contact with each other in the second direction by utilizing the fact that the cross-sectional shape of the rectangular conductor is deformed into a trapezoidal shape. The coil 40 can be downsized in the second direction (see "ΔL" in FIG. 8). It becomes possible to adopt a rectangular conductor having a large dimension in the second direction.

(2) The motor 10 includes the rotor 20 and the stator 30 (see FIGS. 1 and 2). The stator 30 includes the coil 40 and the stator core 31. The stator core 31 is formed by laminating steel plates. The stator core 31 includes the yoke 32 and the tooth 35. The coil 40 is provided to the tooth 35.

The motor 10 can be downsized. In the motor 10, it may be possible to improve the space factor. The efficiency of the motor 10 can be improved by improving the space factor.

<Modification>

The embodiment can also be as follows. Some of the configurations of the modifications described below may be appropriately combined and adopted. Hereinafter, points different from the above description will be described, and the description of the same points will be appropriately omitted.

(1) As rotary machine, the inner rotary type motor 10 has been described as an example. The motor 10 includes the coil 40 in the stator 30 (see FIGS. 1 and 2). The coil structure of the coil 40 includes the staggered structure (see FIGS. 6, 7 and the upper row of FIG. 8). Such a coil structure adopted by the coil 40 can also be adopted as a stator coil of an exterior rotary type motor. In addition, the coil structure of the coil 40 can also be adopted as a stator coil of a generator and a transformer coil.

(2) In the case in which the motor 10 is used as a reference, the first axial direction coincides with the lamination direction, and the second axial direction is perpendicular to both the lamination direction and the radial direction. The settings of the first axial direction and the second axial direction may be opposite to the above. That is, in the case in which the motor 10 is used as a reference, the first axial direction may be perpendicular to both the lamination direction and the radial direction, and the second axial direction may coincide with the lamination direction.

(3) In the stator 30, the plurality of coils 40 forming the coil unit 42 for one phase are connected in parallel (see FIG. 5). A plurality of coils in a coil unit for one phase may be connected in series. In this case, the coil unit for one phase can be formed from one continuous rectangular conductor by adopting the techniques disclosed in Patent Documents 1 and 2. The coil unit for one phase can be manufactured by using a winding machine similar to the winding machines disclosed in Patent Documents 1 to 3 and by a method similar to the winding method disclosed therein. However, similar to the coil 40, the coil is wound to have a coil structure including a staggered structure. Assume that a stator core includes twelve teeth, similar to the above-mentioned stator 30. A rectangular conductor that connects a plurality of coils installed in series is referred to as a "crossover wire". The coil unit for one phase includes four coils each having one lead wire at each end and connected by three crossover wires. That is, the four coils, the three crossover wires and the two lead wires in the coil unit for one phase are continuous in the order of the lead wire, the coil, the crossover wire, the coil, the crossover wire, the coil, the crossover wire, the coil, and the lead wire. Assume that the U-phase, V-phase, and W-phase coil units are connected in a star connection. In this case, one of the two lead wires in the U-phase, V-phase, and W-phase coil units is connected with one lead wire of the other phase coil unit, and the remaining one of the two lead wires is connected to the connection terminal of the corresponding phase.

DESCRIPTION OF THE REFERENCE SIGNS

10 Motor
20 Rotor
21 Rotor core
22 Shaft
30 Stator
31 Stator core
32 Yoke
33 Yoke piece
34 Mounting groove
35 Tooth
36 Slot
40, 40U, 40V, 40W Coil
41, 41U, 41V, 41W Lead wire

42, 42U, 42V, 42W Coil unit
43, 43U, 43V, 43W Connection terminal
44 First coupling conductor
45 Second coupling conductor
50, 51, 52, 53, 54, 55, 56 Coil layer
60 Insulating member
70 Coil
71, 72, 73, 74, 75, 76 Coil layer
A First portion
B Second portion
C Third portion
D Fourth portion
E1 first axial portion
E2 Second axial portion
S Gap

The invention claimed is:

1. A coil comprising:

a first coil layer which is formed by winding a rectangular conductor in a spiral shape, and a second coil layer which is connected with the first coil layer by the rectangular conductor and formed by winding the rectangular conductor in a spiral shape, wherein the second coil layer contacts with a second side surface on a second side in a second direction of the first coil layer at a first side surface on a first side in the second direction of the second coil layer, the second direction being perpendicular to a radial first direction where the rectangular conductor overlaps at the first coil layer and the second coil layer, wherein the first coil layer including:

a first portion including a first axial portion, a corner portion extending from the first axial portion of the first portion, and a second axial portion extending from the corner portion of the first portion such that the corner portion of the first portion is in between the first axial portion of the first portion and the second axial portion of the first portion, the first axial portion of the first portion extending in a direction perpendicular to the second axial portion of the first portion, and a second portion which is continuous with the first portion and contacts with an outer peripheral surface of the first portion at an inner peripheral surface of the second portion, the second portion including a first axial portion, a corner portion extending from the first axial portion of the second portion and a second axial portion extending from the corner portion of the second portion such that the corner portion of the second portion is in between the first axial portion of the second portion and the second axial portion of the second portion, the first axial portion of the second portion extending in a direction perpendicular to the second axial portion of the second portion, wherein the second coil layer including:

a third portion including a first axial portion, a corner portion extending from the first axial portion of the third portion and a second axial portion extending from the corner portion of the third portion such that the corner portion of the third portion is in between the first axial portion of the third portion and the second axial portion of the third portion, the first axial portion of the third portion extending in a direction perpendicular to the second axial portion of the third portion, and a fourth portion which is continuous with the third portion and contacts with an outer peripheral surface of the third portion at an inner peripheral surface of the fourth portion, the fourth portion including a first axial portion, a corner portion extending from the first axial portion of the fourth portion, and a second axial portion extending from the corner portion of the fourth portion such that the corner portion of the fourth portion is in between the first axial portion of the fourth portion and the second axial portion of the fourth portion, the first axial portion of the fourth portion extending in a direction perpendicular to the second axial portion of the fourth portion, wherein the third portion is adjacent to the first portion and the second portion in the second direction in a contacting state in which the first side surface and the second side surface are in contact, wherein the fourth portion is not adjacent to the first portion in the second direction and is adjacent to the second portion in the second direction in the contacting state, wherein the outer peripheral surface of the third portion is arranged closer to an outer peripheral side of the coil in the first direction than the outer peripheral surface of the first portion, and closer to an inner peripheral side of the coil in the first direction than an outer peripheral surface of the second portion in the contacting state, wherein an outer peripheral surface of the fourth portion is arranged closer to the outer peripheral side in the first direction than the outer peripheral surface of the second portion in the contacting state, wherein the corner portion of the first portion contacts the corner portion of the third portion at a first location and the corner portion of the second portion contacts the corner portion of the fourth portion at a second location, a plane perpendicular to the outer peripheral surface of the first portion being coincident with the first location and the second location, and wherein a first part of the corner portion of the second portion is on a first side of the plane and a second part of the corner portion of the second portion is on a second side of the plane opposite the first side.

2. The coil according to claim 1, wherein the outer peripheral surface of the third portion is arranged closer to the outer peripheral side in a first axial direction as the first direction than the outer peripheral surface of the first portion, and closer to the inner peripheral side in the first axial direction than the outer peripheral surface of the second portion in the contacting state, and wherein the outer peripheral surface of the fourth portion is arranged closer to the outer peripheral side in the first axial direction than the outer peripheral surface of the second portion in the contacting state.

3. The coil according to claim 2, wherein the outer peripheral surface of the third portion is arranged 1 closer to the outer peripheral side in a second axial direction as the first direction than the outer peripheral surface of the first portion, the second axial direction being a direction which is perpendicular to the first axial direction, and closer to the inner peripheral side in the second axial direction than the outer peripheral surface of the second portion in the contacting state, and wherein the outer peripheral surface of the fourth portion is arranged closer to the outer peripheral side in the second axial direction than the outer peripheral surface of the second portion in the contacting state.

4. A rotary machine comprising:
a rotor, and
a stator,
wherein the stator includes:
the coil according to claim 3, and
a stator core which is formed by laminating steel plates and includes a yoke, and a tooth which protrudes in the second direction from the yoke towards a side of the rotor,
wherein the coil is provided to the tooth.

5. A rotary machine comprising:
a rotor, and
a stator,
wherein the stator includes:
the coil according to claim 2, and
a stator core which is formed by laminating steel plates and includes a yoke, and a tooth which protrudes in the second direction from the yoke towards a side of the rotor,
wherein the coil is provided to the tooth.

6. A rotary machine comprising:
a rotor, and
a stator,
wherein the stator includes:
the coil according to claim 1, and
a stator core which is formed by laminating steel plates and includes a yoke, and a tooth which protrudes in the second direction from the yoke towards a side of the rotor,
wherein the coil is provided to the tooth.

* * * * *